US012678883B1

(12) United States Patent
Boelter

(10) Patent No.: US 12,678,883 B1
(45) Date of Patent: Jul. 14, 2026

(54) SYSTEM, METHOD AND APPARATUS FOR STUD WELDING

(71) Applicant: Valmont Industries, Inc., Omaha, NE (US)

(72) Inventor: Justin B. Boelter, Gretna, NE (US)

(73) Assignee: Valmont Industries, Inc., Omaha, NE (US)

( * ) Notice: Subject to any disclaimer, the term of this patent is extended or adjusted under 35 U.S.C. 154(b) by 1009 days.

(21) Appl. No.: 17/884,671

(22) Filed: Aug. 10, 2022

Related U.S. Application Data

(60) Provisional application No. 63/238,355, filed on Aug. 30, 2021.

(51) Int. Cl.
| | |
|---|---|
| *B23K 9/20* | (2006.01) |
| *B23K 9/32* | (2006.01) |
| *B23K 37/02* | (2006.01) |
| *B24B 49/12* | (2006.01) |
| *G05B 19/4155* | (2006.01) |
| *G05D 3/12* | (2006.01) |

(52) U.S. Cl.
CPC .................. *B23K 9/20* (2013.01); *B23K 9/32* (2013.01); *B23K 37/0223* (2013.01); *B24B 49/12* (2013.01); *G05B 19/4155* (2013.01); *G05D 3/12* (2013.01); *G05B 2219/33099* (2013.01); *G05B 2219/45135* (2013.01)

(58) Field of Classification Search
CPC ........ B23K 9/20; B23K 9/32; B23K 37/0223; B24B 49/12; G05B 19/4155; G05B 2219/33099; G05B 2219/45135; G05D 3/12
See application file for complete search history.

(56) References Cited

U.S. PATENT DOCUMENTS

| | | | | |
|---|---|---|---|---|
| 5,130,510 A | * | 7/1992 | Zeigler | B23K 9/20 |
| | | | | 219/98 |
| 2016/0214199 A1 | * | 7/2016 | Benzing | B23K 26/08 |

\* cited by examiner

*Primary Examiner* — Steven W Crabb
*Assistant Examiner* — Dilnessa B Belay
(74) *Attorney, Agent, or Firm* — Milligan PC LLO

(57) ABSTRACT

A system, method and apparatus for welding a group of welding studs to the surface of an inputted base material using a stud welding gun. According to a preferred embodiment, the method of the present invention may include the steps of: uploading CAD specifications for the base material; calculating targeted weld locations based on the CAD specifications; initiating a first set of side rollers and drive rollers to in-intake the base material; measuring the location of the base material along a first axis; controlling the first set of side rollers and drive rollers to position the base material at a first location along a first axis based on the measured location of the base material along the first axis; measuring the relative horizonal and vertical distances between the stud welding gun and each of the respective stud welding areas indicated in the inputted CAD data; controlling a first set of carriage servo motors to move the stud welding gun into a first target position along a second axis relative to the measured location of the base material; controlling a second set of vertical positioning assemblies to adjust the vertical distance of the welding gun along a third axis relative to the measured location of the base material; executing stud welds to secure studs to the base material; and initiating rotary sanding, peening or other supplemental processing to a stud weld area.

19 Claims, 7 Drawing Sheets

SYSTEM, METHOD AND APPARATUS FOR STUD WELDING

RELATED APPLICATIONS

The present application is a continuation-in-part of U.S. Patent Application No. 63/238,355 filed Aug. 30, 2021.

FIELD OF THE PRESENT INVENTION

The present invention relates to a system, method and apparatus for stud welding.

BACKGROUND OF THE INVENTION

The process for welding studs to a given surface remains a very manual and repetitive operation. Most commonly, individual welders are responsible for attaching individual studs through the use of welding guns or the like. With larger studs, robotic assistance has been used to move and place the studs. However, supervising welders are still required to confirm placement, apply the welds and/or to confirm welding quality.

Large steel structures, such as bridges, generally require significant numbers of welded studs to be mounted to the top flange of a manufactured steel deck. Once on site, the steel reinforced deck is mounted to piers and then a concrete bridge deck is poured and bonded to the steel decking. Accordingly, the welded studs must be attached at the factory in a precise and cost effective manner.

For the larger studs as used with bridge building components, there does not currently exist a system which is capable of welding studs to surfaces with the precision and strength needed in large scale manufacturing.

SUMMARY OF THE PRESENT INVENTION

To address the shortcomings presented in the prior art, the present invention teaches an improved system, method and apparatus for stud welding.

According to a first preferred embodiment, the method of the present invention includes the steps of: uploading CAD specifications for a base material; calculating targeted weld locations based on the CAD specifications; initiating a first set of side rollers and drive rollers to in-intake the base material; measuring the location of the base material along a first axis; and controlling the first set of side rollers and drive rollers to position the base material at a first location along the first axis based on the measured location of the base material along the first axis.

According to a further preferred embodiment, the method of the present invention may further include the steps of: measuring the relative horizonal and vertical distances between the stud welding gun and each of the respective stud welding areas indicated in the inputted CAD data; and controlling a first set of carriage servo motors to move the stud welding gun into a first target position along a second axis relative to the measured location of the base material.

According to a further preferred embodiment, the method of the present invention may further include the steps of: controlling a second set of vertical positioning assemblies to adjust the vertical distance of the welding gun along a third axis relative to the measured location of the base material; executing stud welds to secure studs to the base material; and initiating rotary sanding, peening or other supplemental processing to a stud welding area.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

BRIEF DESCRIPTION OF THE DRAWINGS

Elements in the figures have not necessarily been drawn to scale in order to enhance their clarity and to improve the understanding of the various elements and embodiments of the invention. Furthermore, elements that are known to be common and well understood to those in the industry are not depicted in order to provide a clear view of the various embodiments of the invention. Thus, it should be understood that the drawings are generalized in form in the interest of clarity and conciseness.

DESCRIPTION OF THE PREFERRED EMBODIMENTS

Figures 1, 2:
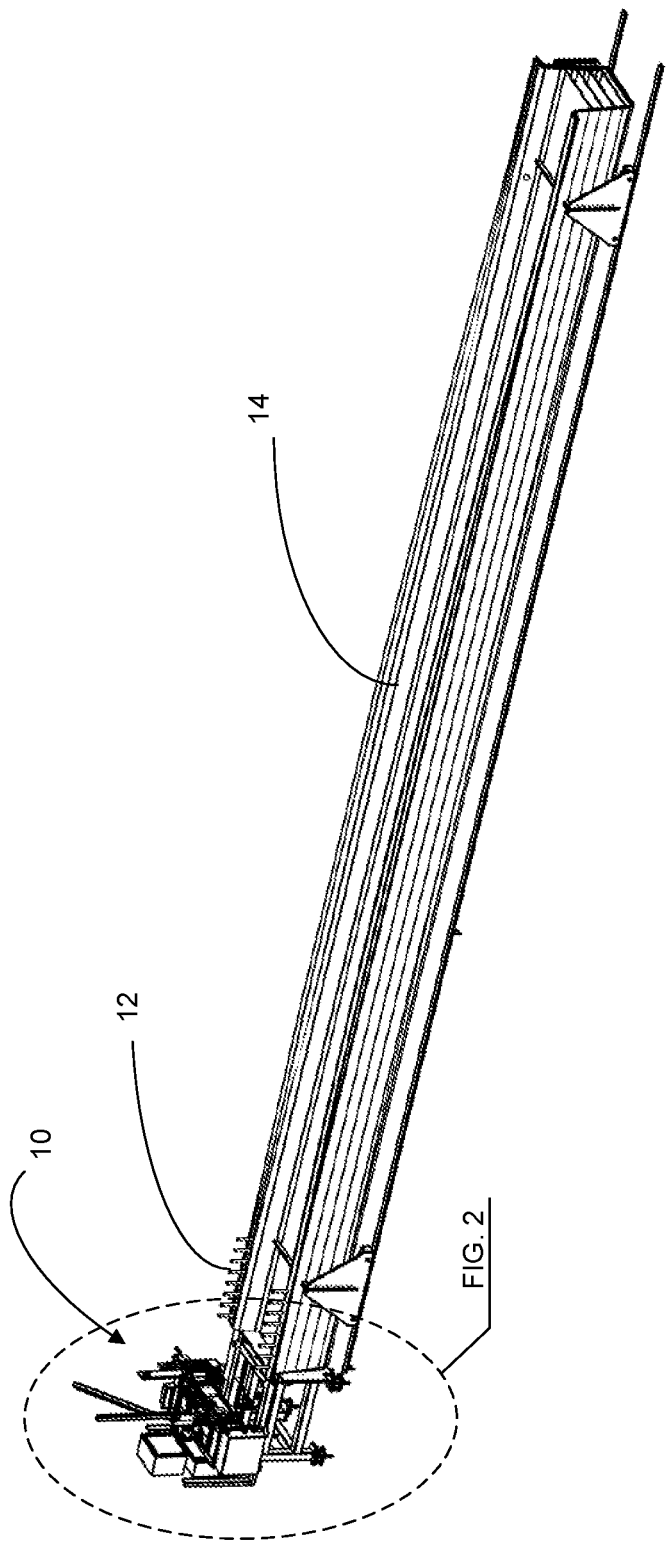
FIG. 1 is a perspective view of a stud welding assembly of the present invention attached to bridge decking material.
FIG. 2 is an enlarged view of the stud welding assembly shown in FIG. 1.
Figure 2:
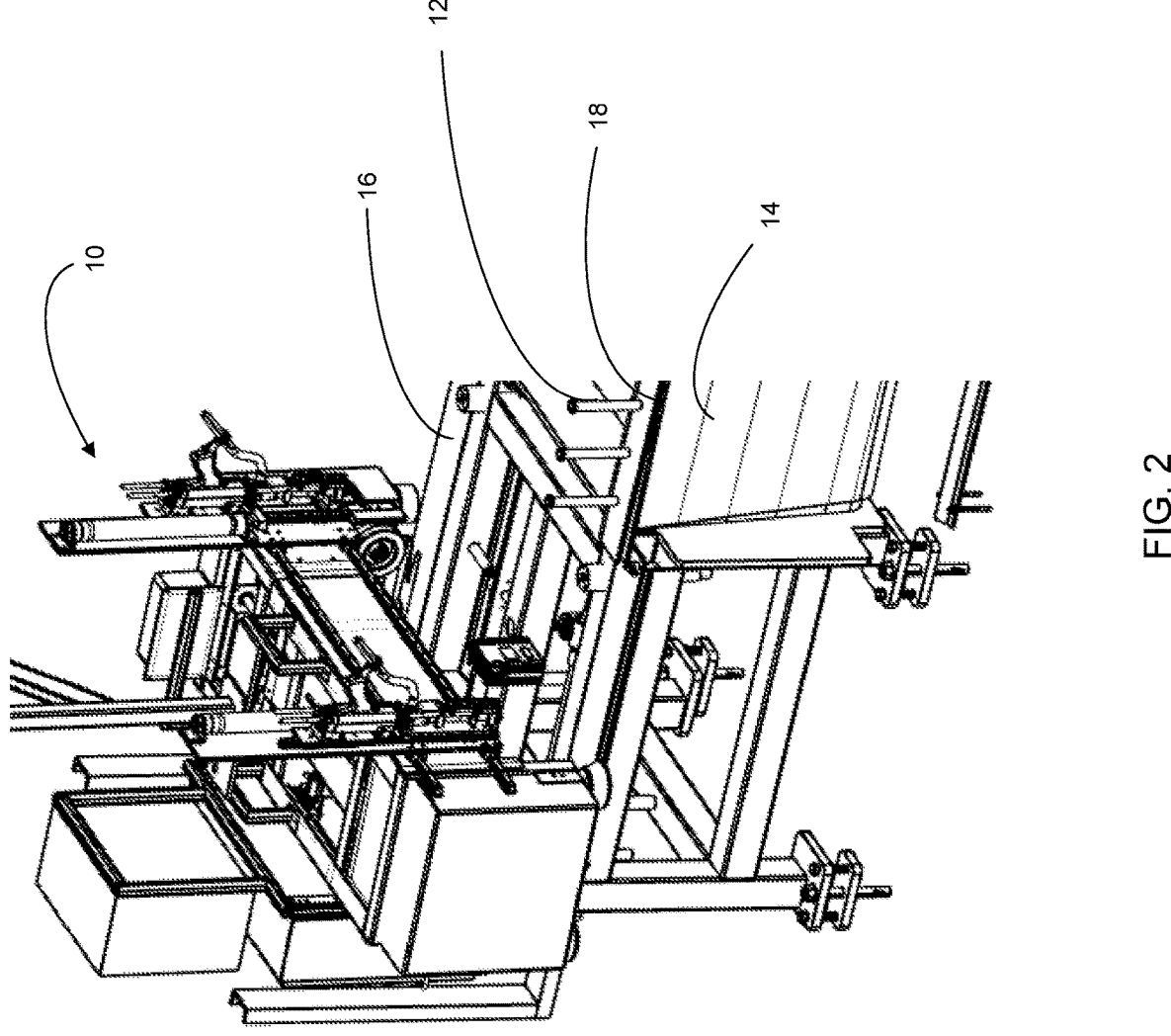

For the purposes of promoting an understanding of the principles of the present invention reference will now be made to the embodiments illustrated in the drawings and specific language will be used to describe the same. It will nevertheless be understood that no limitation of the scope of the present invention is hereby intended and such alterations and further modifications in the illustrated devices are contemplated as would normally occur to on skilled in the art.

Reference is now made in detail to the exemplary embodiments of the invention, examples of which are illustrated in the accompanying drawings. The description, embodiments and figures are not to be taken as limiting the scope of the claims. It should also be understood that throughout this disclosure, unless logically required to be otherwise, where a process or method is shown or described, the steps of the method may be performed in any order, repetitively, iteratively or simultaneously. As used throughout this application, the word "may" is used in a permissive sense (i.e., meaning "having the potential to"), rather than the mandatory sense (i.e. meaning "must").

The present invention is discussed with respect to specific welding arrangements, techniques and materials. However, it should be understood that the present invention is intended for use with a variety of welding processes. Further, the present invention may be used to weld any type of base materials (i.e., steel, cast iron, aluminum etc.) without limitation.

With reference now to FIGS. 1-7, the present invention teaches an improved system, method and apparatus for stud welding. As should be understood, the examples discussed herein are intended to be illustrative and any of a variety of alternative systems, embodiments and/or configurations may be used with the present invention without limitation.

With reference now to FIG. 1, a perspective view of a stud welding assembly 10 of the present invention is shown attached to bridge decking material 14. As shown, the stud welding assembly 10 of the present invention may prefer- ably be used to allow the sequential attachment of welding studs 12 to the decking material 14.

FIG. 2 provides an enlarged view of the stud welding assembly 10. As shown in FIG. 2, the stud welding assembly 10 is preferably secured to an assembly frame 16 which allows for the stud welding assembly 10 to move over the surface of a decking flange 18 (or other surface) and to sequentially position and weld each welding stud 12 as discussed further below.

Figure 3:
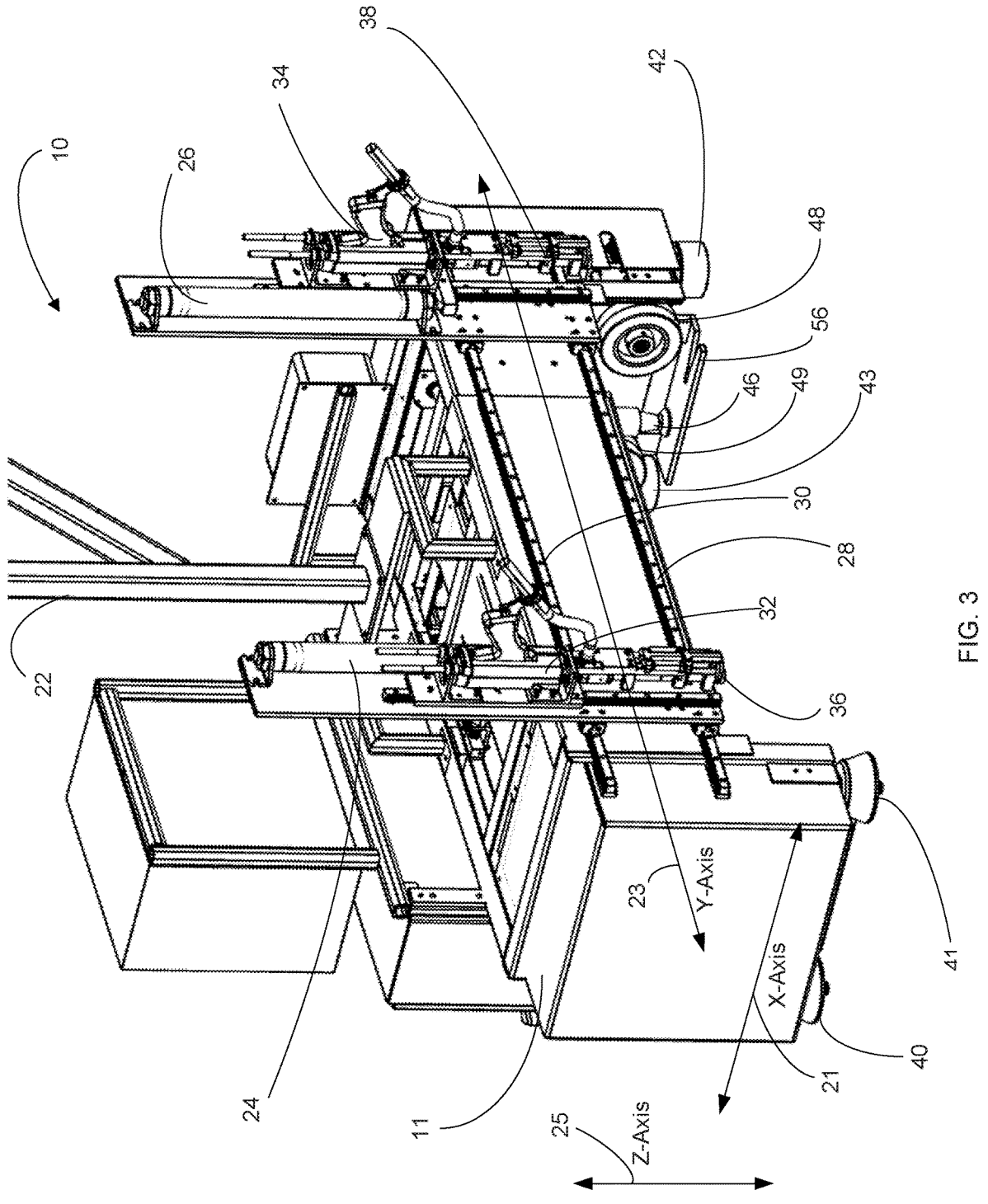
FIG. 3 is a perspective view of an exemplary stud welding assembly of the present invention.
Figure 4:
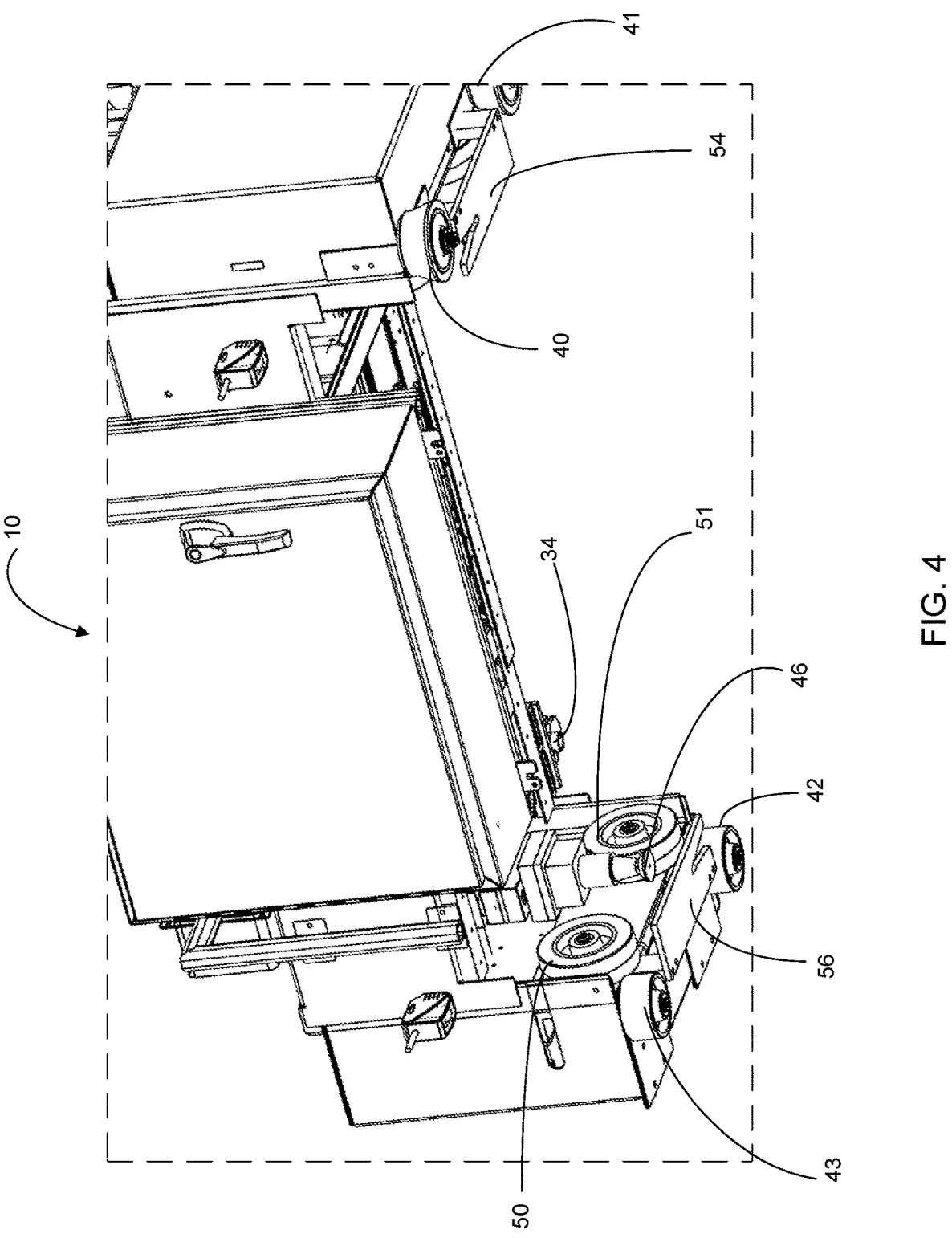
FIG. 4 is a perspective view of the underside and rear of the exemplary stud assembly shown in FIG. 3.
Figure 5:
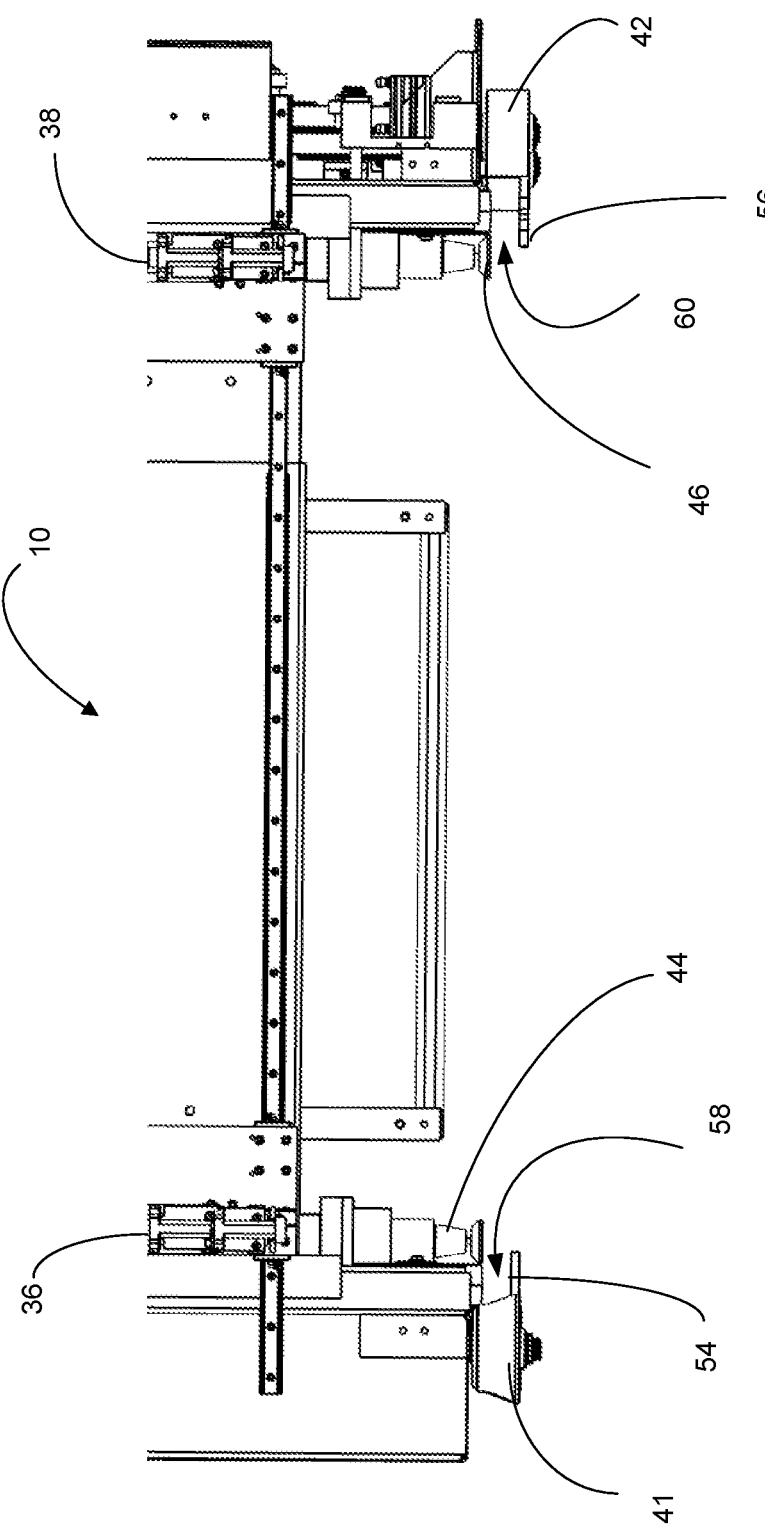
FIG. 5 is a front view of the exemplary stud assembly shown in FIGS. 3 and 4.

With reference now to FIGS. 3-5, perspective views of an exemplary stud welding assembly 10 shall now be discussed in more detail. As shown, the stud welding assembly 10 of the present invention preferably includes a welding assem- bly main body 11, a cable guide 22 which preferably acts as a guide and attachment point for control and power cables routed to the stud welding assembly 10. The stud welding assembly 10 as shown includes a pair of stud welding guns 32, 34 which are supported by respective stud welding gun legs 36, 38. FIG. 3 includes labels showing the multiple axes used to discuss the motion and degrees of freedom of the present invention. Specifically, FIG. 3 includes labels for the X-axis 21 (along the length of the base material as it moves into the stud welding assembly), the Y-axis 23 (along the width of the stud welding assembly 10 and substantially perpendicular to the X-axis 21); and the Z-axis 25 (the vertical direction between stud welding assembly 10 and the received decking materials 14; the Z-axis 25 is perpendicu- lar to the X-axis and the Y-axis).

According to a preferred embodiment, each stud welding gun 32, 34 is preferably attached to an upper and lower ball bearing carriage 28, 30. Together, the carriages 28, 30 preferably allow the stud welding guns 32, 34 to horizontally translate across the front face of the stud welding assembly 10 (e.g., along the Y-axis of the base material) as directed by the system controller to a targeted Y-axis value as discussed further below.

The stud welding assembly 10 preferably further includes a set of side rollers 40, 41, 42, 43 and drive rollers 48, 49, 50, 51, which are controlled by servo motors and the main system controller. The side rollers 40-43 may preferably be formed of resilient materials to frictionally receive and pull base materials (i.e., decking flange 18 or the like) so that the stud welding assembly 10 is propelled across the surface of the base materials. In this way, the stud welding assembly 10 and the stud welding guns 32, 34 are preferably moved and positioned along the X-axis of the base material to a targeted X-axis value as discussed further below.

As shown in FIG. 5, the stud welding assembly 10 preferably includes one or more guide plates 54, 56 which preferably include smooth upper surfaces to receive planar decking material 14. Preferably, the guide plates 54, 56 are positioned to form left and right docking slots 58, 60 which are preferably adjustably sized to receive the decking mate- rials 14 between the side rollers 40-43 and drive rollers 48-51.

Referring again to FIGS. 3 and 4, the stud welding assembly 10 preferably further includes vertical positioning assemblies 24, 26 which preferably operate to adjust the vertical distance (Z-axis distance) between the stud welding guns 32, 34 and the received decking materials 14 as the materials move within the docking slots 58, 60. In this way, the stud welding assembly 10 and the stud welding guns 32, 34 are preferably moved and positioned along the Z-axis relative to the base material to a targeted Z-axis value as discussed further below.

As further shown, the stud welding assembly 10 prefer- ably may further include additional devices to treat and finish the surface of any welding stud attached by the stud welding assembly 10. For example, orbital sanders 44, 46 may preferably be adjustably attached to the system via an adjustable tool spindle or the like as discussed further below.

Figure 6:
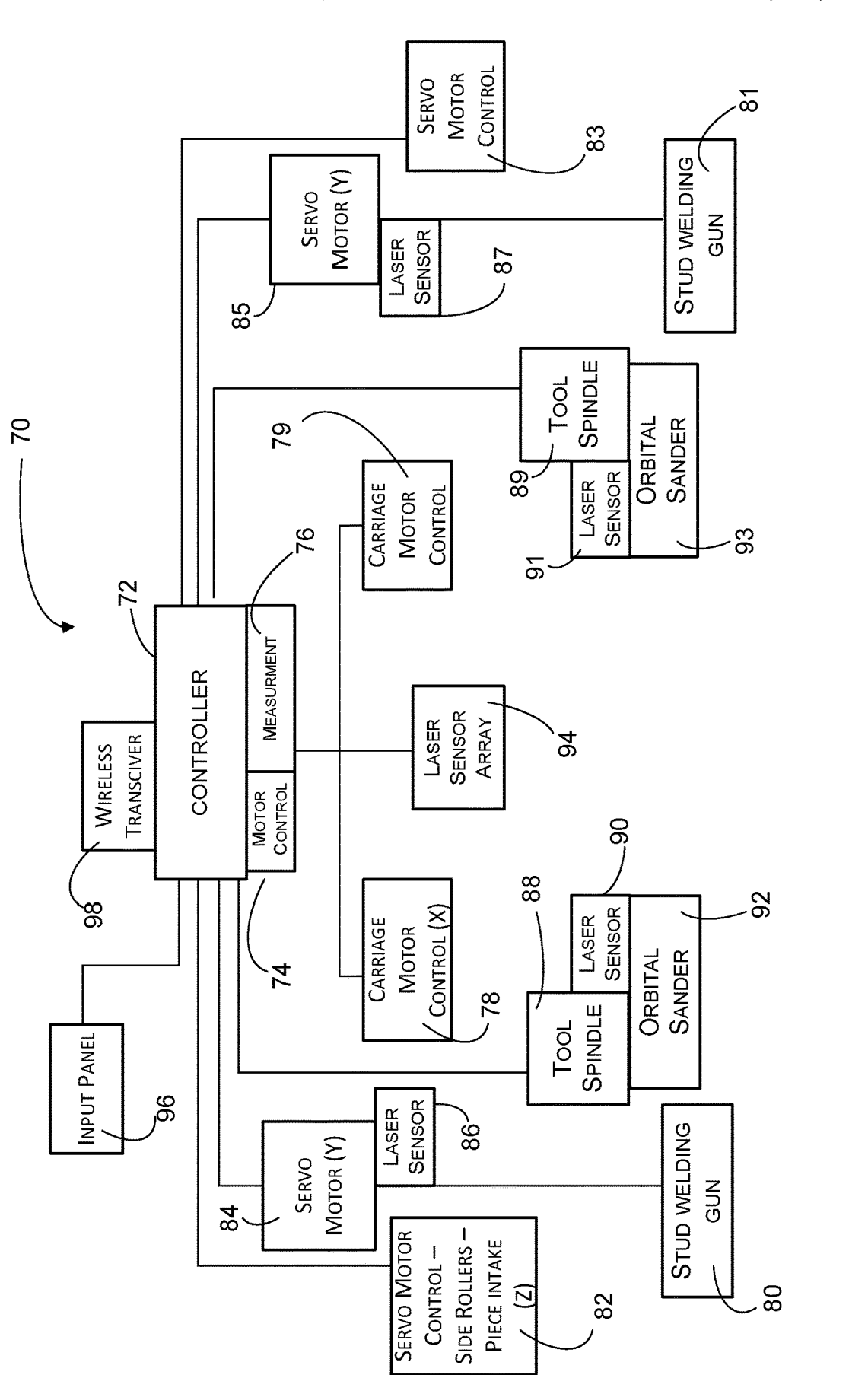
FIG. 6 is a block diagram of an exemplary motor, sensor and control system of the present invention.

With reference now to FIG. 6, a functional diagram of an exemplary control system 70 of the present invention is shown. As shown, the control system 70 of the present invention may preferably include a main controller 72 for controlling the functions, operations, motors and sensors of the present invention. The controller 72 may preferably include or be linked to a CNC controller for controlling the systems of the present invention as discussed further below. The controller 72 preferably includes motor control 74 and measurement 76 modules to control the operations, move- ments and actions of the system elements as discussed herein. The system 70 preferably includes an input panel 96 which may be directly attached to the controller 72 or may be remotely linked. The system may also include a wireless transceiver 98 for remote control and monitoring of the controller 72 and its sub-systems. The wireless transceiver 98 may preferably use any type of wireless protocol without limitation. These may include Bluetooth, Wi-Fi, 3-5G, sat- ellite and the like. The system 70 may preferably commu- nicate with and allow remote control and programming of the system 70 via remote server, PDA, smart phone, com- puter, and the like. Instructions and data may also be received and entered into the system via an input panel 96 which may be a fixed terminal or may include wired inputs such as USB inputs or the like.

The controller 72 may preferably be linked and pro- grammed to control each of the motor and sensing systems of the present invention. As shown, the controller 72 is preferably first linked to servo motors 82, 83 to control the side rollers 40-43 of the present invention in response to one or more measurement sensors 94. According to a preferred embodiment, the measurement sensors 94 may be laser, imaging or IR sensors which can sense the relative position of the received decking materials 14 to the stud welding assembly 10 as the materials move within the docking slots 58, 60. In this way, the relative position between the decking materials 14 and the stud welding guns 80, 81 along a first axis (i.e., the X-axis) are preferably controlled to achieve a targeted X-axis value as discussed further below. According to further preferred embodiments, additional fine motors (such as adjustable tool spindles or the like) may be further used and connected to each stud welding gun 80, 81 to provide finer adjustments.

The controller 72 is also preferably linked to servo motors 84, 85 to control the height of each stud welding gun 80, 81 in response to one or more measurement sensors 86, 87. According to a preferred embodiment, the measurement sensors 86, 87 may be laser, imaging or IR sensors which can sense the relative vertical positions (e.g., relative Z-axis locations) of the received decking materials 14 to the stud welding assembly 10 as the materials move within the docking slots 58, 60. In this way, the relative positioning between the decking materials 14 and the stud welding guns 80, 81 along the Z-axis are preferably measured and controlled to achieve targeted Z-axis values for selected stud welding as discussed further below.

Additionally, the controller 72 may also preferably be linked to servo/carriage motors 78, 79 to control the horizontal positioning (e.g., relative Y-axis locations) of each stud welding gun 80, 81 in response to one or more measurement sensors 86, 87, 94. According to a preferred embodiment, the measurement sensors may be laser, imaging or IR sensors which can sense the relative position of the received decking materials 14 to the stud welding assembly 10 as the materials move within the docking slots 58, 60. In this way, the relative position between the decking materials 14 and the stud welding guns 80, 81 along the Y-axis is preferably measured and controlled to achieve targeted Y-axis values for selected stud welding as discussed further below.

The controller 72 may also preferably be linked to any number of additional auxiliary tools and devices which may assist in the stud welding and finishing process. For example, as shown, the controller 72 may be linked to and control the positioning and operation of orbital sanders 92, 93. The positioning of the orbital sanders 92, 93 may be adjusted using any of the X, Y, and Z axis controls as discussed above. Alternatively, the controller 72 may control the location of the orbital sanders 92, 93 by adjusting motorized tool spindles 88, 89. Additionally, the relative location of the orbital sanders 92, 93 may be calculated or inferred from any of the measurement devices 86, 87, 94 of the present invention. Alternatively, their locations may be separately calculated and/or determined using dedicated laser sensors 90, 91.

Figure 7:
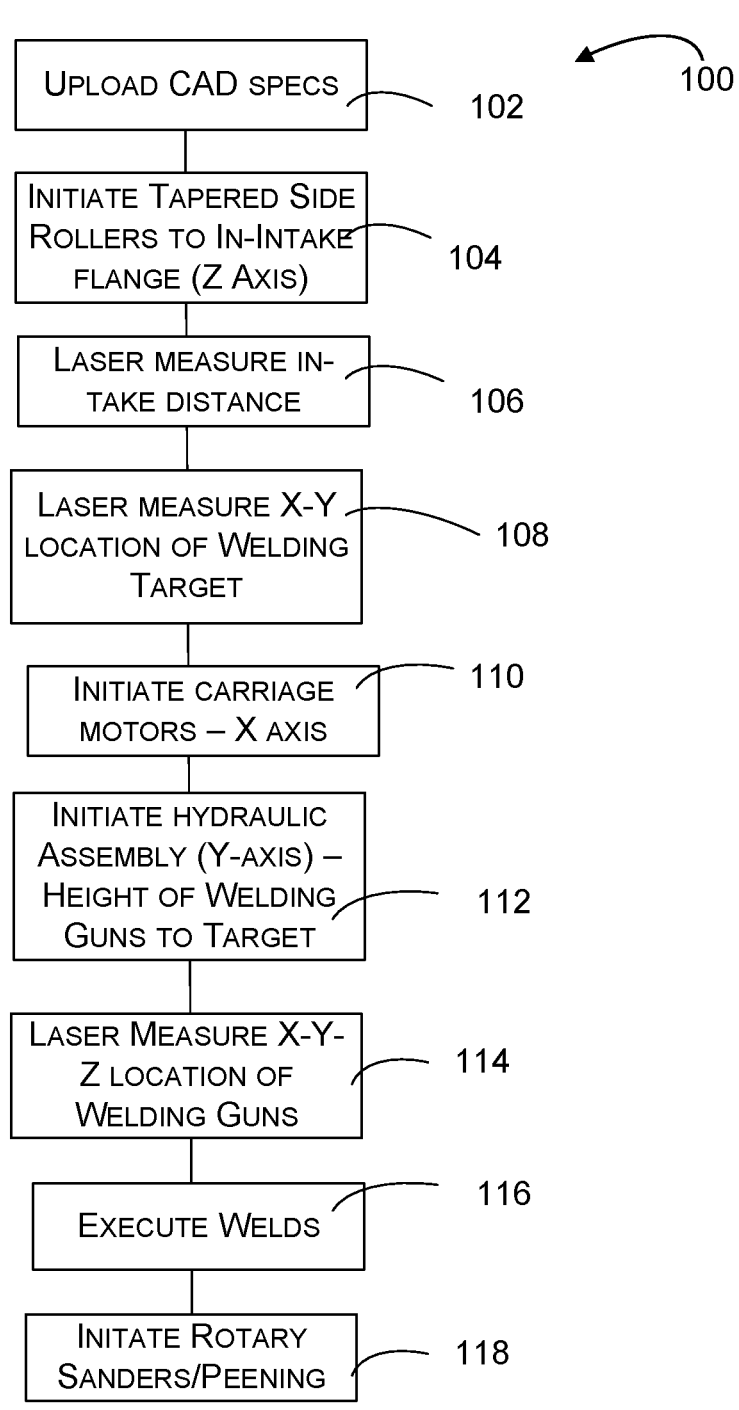
FIG. 7 is a block diagram illustrating an exemplary method in accordance with aspects of the present invention.

With reference now to FIG. 7, an exemplary method 100 for implementing aspects of the present invention shall now be discussed. At a first step 102, the system may preferably identify the CAD specifications/data (e.g., material type, dimensions etc.) and upload and/or calculate targeted weld locations for an identified group of studs to be welded onto the inputted material. This information may be inputted by a user or identified by the system via a visual scan or the like. At a next step 104, the system may preferably control a set of side rollers 40, 41, 42, 43 and/or drive rollers 48, 49, 50, 51 to in-intake a given set of material and to adjust the location of the material relative to the stud welding guns 80, 81 along a first axis (e.g., the X-axis) based on a laser measured in-take distance (step 106).

At a next step 108, the system may then measure the relative horizonal and vertical distances between the stud welding guns 80, 81 and each of the respective stud welding areas indicated in the inputted CAD data. At a next step 110, the system of the present invention may preferably then initiate the carriage servo motors 78, 79 to move the stud welding guns 80, 81 into the correct positions relative to each target area along a second axis (e.g., the Y-axis) based on the laser measurements.

At a next step 112, the system may then initiate the vertical positioning assemblies 84, 85 which preferably operate to adjust the vertical distance (e.g., Z-axis distance) of the welding guns 80, 81 relative to each target weld area. At a next step 114, the system of the present invention may then preferably re-check and confirm the relative locations (e.g., X-Y-Z axis locations) of the welding guns 80, 81 to each target weld area. At a next step 116, the system may then execute the stud welds to secure studs to the target surface. At a next step 118, the system may then proceed to initiate rotary sanding, peening or other supplemental processing of the stud weld area.

The present invention has been disclosed above with reference to several examples. These examples are not intended to be limiting. For example, the system may include any of a variety of additional tools and motors such as any type of direct-drive stepper motors or servo motors. The system may also use step-down gears or the like in combination with a given motor. Further, both closed-loop and open loop control architectures may be used without limitation. Accordingly, the scope of the present invention should be determined purely by the terms of the appended claims and their legal equivalents.

What is claimed is:

1. A stud welding assembly for moving over the surface of a base material and to sequentially position and weld a plurality of welding studs; the stud welding assembly comprising:

a welding assembly main body;

an upper ball bearing carriage track;

a lower ball bearing carriage track; wherein the upper and lower ball bearing carriage tracks are attached to a front surface of the welding assembly main body;

a left stud gun assembly; wherein the left study gun assembly comprises:

a left vertical positioning assembly;

a left stud welding gun; and a left stud welding gun leg;

a right stud gun assembly; wherein the right stud gun assembly comprises:

a right vertical positioning assembly;

a right stud welding gun; and a right stud welding gun leg;

wherein the left stud gun assembly is movably attached to the upper ball bearing carriage track and the lower ball bearing carriage track; wherein the right stud gun assembly is movably attached to the upper ball bearing carriage track and the lower ball bearing carriage track; wherein the upper and lower ball bearing carriage tracks allow the right and left stud welding guns to horizontally translate across the front face of the stud welding assembly;

a system controller; wherein the system controller is configured to direct the movement of the right and left stud welding gun assemblies to one or more targeted Y-axis values;

a plurality of side rollers;

a plurality of drive rollers; wherein the system controller is configured to control the rotational movement of the plurality of side rollers and the plurality of drive rollers;

wherein the plurality of drive rollers and the plurality of side rollers are configured to frictionally receive and pull the base material to propel the stud welding assembly across the surface of the base material;

wherein the system controller is configured to control the side rollers and the drive rollers to position the stud welding assembly and the stud welding guns to a targeted X-axis value; and a plurality of guide plates; wherein the plurality of guide plates comprise at least a left guide plate and a right guide plate; wherein the plurality of guide plates comprise smooth upper surfaces to receive the base material; wherein the left guide plate forms a left docking slot; wherein the left docking slot is adjustably sized to receive the base material with the base material in contact between the left docking slot and at least one drive roller;

wherein the left and right vertical positioning assemblies are configured to adjust the vertical distance between the right and left stud welding guns and the received base material as the base material moves within the right docking slot and left docking slot;

wherein the system controller is configured to independently adjust the positions of the right and left stud welding guns along the Z-axis relative to the base material to a targeted Z-axis value.

2. The system of claim 1, wherein the stud welding assembly further comprises one or more auxiliary devices to treat and finish the surface of a welding stud attached by the stud welding assembly to the base material.

3. The system of claim 2, wherein the one or more auxiliary devices comprise orbital sanders.

4. The system of claim 3, wherein the orbital sanders comprise a left orbital sander and a right orbital sander.

5. The system of claim 4, wherein the left and right orbital sanders are adjustably attached via an adjustable tool spindle.

6. The system of claim 5, wherein the system controller comprises a Computer Numeric Controller (CNC) controller.

7. The system of claim 6, wherein the system controller comprises a motor control module.

8. The system of claim 7, wherein the system controller comprises a measurement module for receiving data from one or more measurement sensors to monitor the relative spacing of system components.

9. The system of claim 8, wherein the system controller is linked to a plurality of servo motors for moving one or more of the side rollers.

10. The system of claim 9, wherein the plurality of side rollers are formed of resilient materials.

11. The system of claim 9, wherein the system controller is configured to control one or more of the side rollers in response to data received from the one or more measurement sensors.

12. The system of claim 11, wherein the one or more measurement sensors comprise at least one sensor selected from the group consisting of laser sensors, imaging sensors, and IR sensors.

13. The system of claim 12, wherein the system controller is configured to control the relative position between the base material and the stud welding guns along a X-axis.

14. The system of claim 13, wherein the system controller is linked to a second plurality of servo motors to control the position of each stud welding gun in response to measuring data from the one or more measurement sensors.

15. The system of claim 14, wherein the system controller is configured to control the relative position between the base material and the stud welding guns along a Z-axis.

16. The system of claim 15, wherein the system controller is configured to control the relative position between the base material and the stud welding guns along an Y-axis.

17. The system of claim 16, wherein the system controller is configured to control the positioning of the one or more auxiliary devices.

18. The system of claim 17, wherein the system controller is configured to control the location of one or more orbital sanders by adjusting one or more motorized tool spindles.

19. The system of claim 18, wherein a target location of at least one of the orbital sanders is determined using a laser sensor.

* * * * *